UNITED STATES PATENT OFFICE.

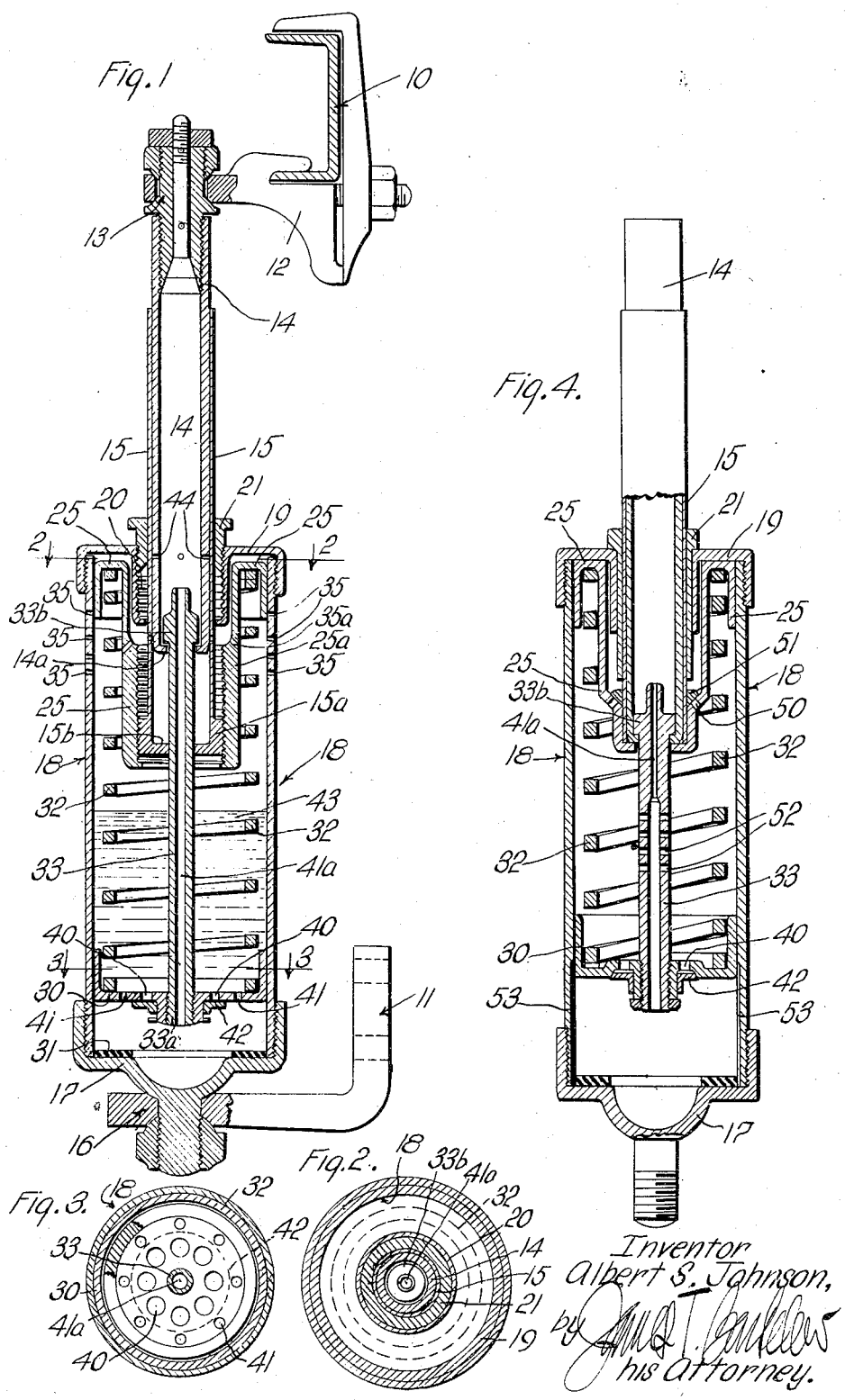

ALBERT S. JOHNSON, OF SAN DIEGO, CALIFORNIA.

SHOCK-ABSORBER.

1,200,199.

Specification of Letters Patent.

Patented Oct. 3, 1916.

Application filed August 2, 1915. Serial No. 43,082.

*To all whom it may concern:*

Be it known that I, ALBERT S. JOHNSON, a citizen of the United States, residing at San Diego, in the county of San Diego, State of California, have invented new and useful Improvements in Shock-Absorbers, of which the following is a specification.

This invention relates to shock absorbers and the like adapted specifically for vehicles; although it will be understood that my shock absorber may be used to check relative movement between any two bodies.

In the particular embodiment herein explained, my invention is specifically adapted for use on an automobile, being connected between the frame and the axle.

It is a primary object of this invention to provide a simple and effective means for quickly, easily and effectually absorbing shocks and checking the vibratory movements between the frame and axle.

It is a further particular object to provide a mechanism in which the restraining force is increased in proportion as the vibration of the frame increases. The mechanism is so arranged that the restraining force which checks the vibration of the frame is automatically increased in proportion as that vibration is excessive; and this provision makes for a quick and smooth checking and reduction of excessive vibration between the frame and axle. Mechanism is so provided that the increased restraining force acts reversely to check the return movement of the frame.

For the purpose of this specification, I have illustrated a preferred specific form of mechanism embodying my invention in the accompanying drawings, in which—

Figure 1 is a vertical longitudinal section of my improved shock absorber, Figs. 2 and 3 are sections taken as indicated by lines 2—2 and 3—3, respectively, on Fig. 1, and Fig. 4 is a section similar to that of Fig. 1 showing a slightly modified form of device.

In the drawings the numeral 10 designates what may be the frame of an automobile and 11 designates a bracket which may be attached to the axle or to any other convenient part. A clamp or bracket 12 fastens around the frame 10 and a suitable universal joint 13 joins this clamp or bracket to the upper end of a hollow rod 14 which extends downwardly in a guiding tube 15, the hollow rod moving in the tube when the parts 10 and 11 move relatively to each other. Another suitable universal joint connects bracket 11 with lower head 17 of a cylinder 18; and this cylinder has an upper head 19 with a packing gland 20 therein, in which packing is compressed around the tube 15 by a suitable annular nut 21 in the ordinary manner. The lower end of the tube 15 is provided with an enlargement $15^a$ which is screw threaded into an extension sleeve $25^a$ of a piston 25 which normally stands at or near the upper end of the cylinder 18 directly underneath the cylinder head 19. When the hollow rod 14 moves downwardly its lower end $14^a$ is adapted to strike the bottom $15^b$ of the end $15^a$ of the tube 15; and, by striking this bottom, the rod 14 in its downward movement will then cause a downward movement of the piston 25. The amount by which the rod 14 may move downwardly before it strikes the bottom $15^b$ may be adjusted by screw threadedly adjusting the tube 15 in the extension $25^a$ of the piston 25. This is my preferred form of means for allowing a certain free downward movement of the rod 14, and of the frame 10, before the piston 25 is started in its downward movement. The amount of this free movement may be adjusted to suit the size, weight and character of spring suspension of the vehicle on which the absorber is placed. It will be seen that this adjustment does not increase or decrease the spring tension but provides a means for early or late contact with normal spring tension. In the lower end of the cylinder 18 I place another piston 30, the normal position of this piston being against a leather or other washer 31 in the lower end of the cylinder against the lower head 17. In Fig. 1 this piston is shown drawn up slightly from its lowermost position, according to the fact that the frame 10 is slightly above its normal position, as hereinafter explained. A heavy motion checking spring 32 is confined between the two pistons 25 and 30 and the tension on this spring when the pistons are at their maximum distance apart may be as desired. According to circumstances, when the spring is in its normal expanded condition, there may be no stress, or a varying amount of stress, upon the spring 32. In any case, it is the function of the spring 32 to resist the movement of either of the pistons 25 or 30 toward the other. Thus, when the frame 10 moves downwardly and the lower end 14ª of the hollow rod 14 strikes the bottom 15ᵇ, as hereinbefore explained, and the piston 25 moves downwardly, the spring 32 opposes such downward movement of the piston 25. When the frame 10 moves relatively upwardly, then it pulls the piston 30 up with it, through the medium of a pull rod 33 attached at its lower end at 33ª to the piston 30 and connected at 33ᵇ with the lower end of the hollow rod 14. The lower end of the hollow rod 14 has an inwardly turned flange at its bottom as illustrated at 14ª; and the head 33ᵇ of the pull rod 33 rests upon this bottom. Downward movement of the rod 14 will not cause downward movement of the piston 30, but upward movement of the rod 14 will cause upward movement of the piston 30 toward the piston 25; and this movement is opposed by the movement of opposing or checking spring 32. In the normal position of the apparatus the piston 30 rests upon the washer 31 at the bottom of the cylinder 18 and the rod 14 is below its position illustrated in Fig. 1 by a distance commensurate with the distance at which the piston 30 is illustrated above the washer 31 in that figure. It is preferred to make the arrangement and adjustment such that upward movement of the frame 10 (or relative movements of the parts 10 and 11 apart from each other) will cause the immediate upward movement of the piston 30 with little or no free upward movement of the frame 10 before the piston 30 begins to move upwardly. On the other hand, it is usually desired that the frame 10 may have a fairly considerable free downward movement before the piston 25 moves downwardly.

From the foregoing specification it will be seen that the relatively vibratory or oscillatory movement of members 10 and 11 will cause alternate movements of the pistons 25 and 30 toward each other, and will cause alternate compressions of the spring 32 from its opposite ends.

It is a particular feature of this invention that I provide means for checking the outward movement of the pistons away from each other instead of allowing them to immediately resume their normal positions at the ends of the cylinder. I may preferably accomplish this action with a fluid pressure checking means, and said fluid pressure checking means may be in the nature of a gas or liquid means. I have illustrated herein an air check for the upper piston 25 and a liquid oil check for the lower piston 30. In the form of check shown for the upper piston 25 I provide a series of air ports 35 through the walls of cylinder 18, said air ports being below the normal position of the piston 25. When the piston 25 is moved downwardly sufficiently to uncover these air ports 35, then outside air rushes into the space above the piston and, when the spring 32 tends to press the piston 25 upwardly then the entrapped air above the piston is pushed out again through the ports (and through any other leakage spaces which may exist in the mechanism within the piston and within the sleeve 25ª). It will be noted that as the piston 25 is forced upwardly, ports 35 are gradually cut off, so that the air escapes more and more slowly. Some of the entrapped air above the piston is pushed from the chamber into the cylinder through port 35ª from where it escapes below the piston through ports 35 which open automatically by upward movement of the piston. But a sufficient volume of this air is compressed in the chamber above the piston to hold the spring in a temporary state of compression. This dampens and prevents the stored energy in the spring from acting as a force to aid the recoil of the vehicle.

Should the downward movement of the piston be violent, there would be greater need for checking the return energy of the spring which would require a greater volume of air above the piston. For this reason, I have shown the lower ports 35 closer together, providing more free inflow of air as the piston moves down, so that the right volume of air to compress in the chamber above the piston is governed automatically according to movement of the piston.

Suppose now that the frame 10 moved violently downwardly, so that the piston 25 has been moved down sufficiently for the action just explained to take place. Upon the subsequent upward rebound of the frame 10 the spring 32 stands initially compressed from its upper end, the piston 25 having not yet had time to resume its normal uppermost position, due to action of the air checks. In other words, when the frame moves excessively downwardly and rebounds excessively (due to the normal free action of the vehicle springs) the spring 32 will be initially compressed and held in extra compression by the mere fact that the frame has taken an initial excessive downward movement; and this extra initial compression of the spring will act downward as a reverse force to materially aid in checking the following upward rebound of the frame. Should this upward rebound be too excessive, then the piston 30 will be moved upwardly; and, when this piston is moved upwardly above the bottom of the cylinder, its movement downwardly is checked by a checking means, preferably utilizing a liquid as a checking agent. Through the piston 30 I provide ports 40 and 41, some of which, say the ports 40, are coverable by a valve 42 which moves up to closing position when the piston 30 moves downwardly. Thus, in the downward movement of the piston, the escape for oil below the piston to the space above the piston is restricted to the ports 41; and the downward movement of the piston is thus checked. The area of the ports 41 may be made to suit the speed at which the piston 30 should resume its normal lowermost position. The aggregate areas of the ports 40 and 41 are sufficient to pass the oil or other liquid freely enough to allow a comparatively free upward movement of the piston 30. The oil 43 is kept in the bottom of the cylinder 18 to about the level indicated. Thus it will be seen that, upon the subsequent upward rebound of the frame 10, piston 30 will be carried upwardly; with the result that the spring 32 will be put under initial compression from its lower end; and, that upon the subsequent falling of the frame 10, the spring will exert an additional force against being compressed from its upper end. It will be seen that this additional compression of the spring 32 at one or both ends will take place but gradually decrease proportionally as the relative movements of members 10 and 11 begin to subside; when the pistons 25 and 30 will gradually resume their normal positions in the cylinder. I may provide an additional oil port 41ª which leads upwardly through the pull rod 33 to its upper end where it discharges through hollow rod 14. Oil discharged into this hollow rod may flow out through openings 44 to the various relatively moving parts.

In its specific mechanical aspect, my shock absorber may be called a combination spring and fluid mechanism; but it will be seen that the co-action of the spring and fluid parts is peculiar. Broadly speaking, I provide a resilient motion opposing member (the spring 32) and also provide in combination therewith a means for placing the member under initial stress, and a checking means for checking the return of the member to its normal relatively unstressed condition. Such a combination provides for the peculiarity of action explained; and this peculiar action may be summed up in the statement that when the excessive movement occurs the spring or other member is put immediately under initial stress to check its own recoil force and effectively oppose the following excessive rebound; and that as long as the movement of the vehicle frame continues to increase, the spring will continue to be put under a greater and greater initial stress; until the movement begins to decrease, when the spring will gradually resume its normal position.

In Fig. 4 I have shown various modifications. In this figure I show ports 50 controlled by a ring valve 51 to allow passage of fluid upwardly therethrough, allowing fluid below the piston 25 to pass to its upper side on the downward movement thereof; entrapping the fluid above said piston so as to form the check as hereinbefore described. Further, I have shown ports 52 leading from passage 41ª to the exterior of the member 33, taking the place of the ports 41, as previously described. In the form shown herein, I have no adjusting member 15, 15ᵇ; as this may be dispensed with and the absorber thereby made simpler. The action of this form is substantially the same as previously described; except in the following particulars; passages 53, or enlargements of the bore of cylinder 18, are provided, so that downward movement of the piston 30 below its normal position, shown in Fig. 4, may be free. Simultaneous downward movement of the upper piston 25 will cause entry of fluid thereabove, which fluid will be entrapped and will then check the upward movement of the piston, which upward movement will correspond in distance to the downward free movement of the lower piston. Should the downward movement be sufficient to press the piston 30 against the lower end of the cylinder, then the spring is compressed from above in the manner described. Should the upward movement be such as to carry the piston 30 above the passages 53, then the action is the same as before described for the form of Fig. 1.

Having described a preferred form of my invention, I claim:

1. In combination with a vibrating body, a means to check its vibrations embodying a resilient motion resisting member connected to the vibrating body to resist its motion in one direction, means actuated by the motion of the body in the opposite direction to initially stress the resilient motion resisting member so as to increase its resistant force, and means acting independently of the motion of the vibrating body to hold the motion resisting member temporarily in its stressed condition.

2. In combination with a vibrating body, a means to check its vibrations embodying a compressive resilient motion resisting member connected to the vibrating body to resist its motion in one direction, means actuated by the motion of the body in the opposite direction to initially compress the resilient motion resisting member so as to increase its resistant force, and means acting independently of the motion of the vibrating body to hold the motion resisting member temporarily in its state of compression.

3. In combination with a vibrating body, a means to check its vibrations embodying a compression spring connected at one end to the body so that movement of the body in one direction tends to compress the spring, means actuated by the motion of the body in the opposite direction to initially compress the spring so as to increase its resistance to compression when the body moves in the first mentioned direction, and means acting independently of the motion of the vibrating body to hold the spring temporarily in its state of initial compression.

4. In combination with a vibrating body, a means to check its vibrations embodying a resilient motion resisting member connected to the vibrating body to resist its motion in one direction, means actuated by the motion of the body in the opposite direction to initially stress the resilient motion resisting member so as to increase its resistant force, and slowly yielding means independent of the vibrating body adapted to check the return of the resilient member from its stressed to its normal condition.

5. In combination with a vibrating body, a means to check its vibrations embodying a compression spring connected at one end to the body so that movement of the body in one direction tends to compress the spring, means actuated by the motion of the body in the opposite direction and acting upon the spring at its other end to initially compress the spring so as to increase its resistance to compression when the body moves in the first mentioned direction, and slowly yielding means independent of the vibrating body adapted to check the spring in its return from its compressed to its normal condition.

6. In combination with a vibrating body, a means to check its vibrations embodying a resilient motion resisting member connected to the vibrating body to resist its motion in one direction, means actuated by the motion of the body in the opposite direction to initially stress the resilient resisting member so as to increase its resistance force, and fluid pressure check means acting independently of the vibrating body to check the resilient motion resisting member against resuming its normal relatively unstressed condition.

7. In combination with a vibrating body, a means to check its vibrations embodying a compressive resilient motion resisting member connected to the vibrating body to resist its motion in one direction, means actuated by the motion of the body in the opposite direction to initially compress the resilient motion resisting member so as to increase its resistant force, and fluid pressure check means acting independently of the vibrating body to check the resilient motion resisting member against resuming its normal relatively uncompressed condition.

8. In combination with a vibrating body, a means to check its vibrations embodying a compression spring connected at one end to the body so that movement of the body in one direction tends to compress the spring, means actuated by the motion of the body in the opposite direction to initially compress the spring so as to increase its resistance to compression when the body moves in the first mentioned direction, and fluid pressure check means acting independently of the vibrating body to check the spring against expanding to its normal relatively uncompressed condition.

9. In combination with a vibrating body, a means to check its vibrations embodying a compression spring connected at one end to the body so that movement of the body in one direction tends to compress the spring, means actuated by the motion of the body in the opposite direction and acting upon the spring at its other end to initially compress the spring so as to increase its resistance to compression when the body moves in the first mentioned direction, and fluid pressure check means independent of the vibrating body acting upon the spring at its second mentioned end to check that end against resuming its normal position when the spring is initially compressed.

10. In combination with a vibrating body, a means to check its vibrations embodying a resilient motion resisting member connected to the vibrating body to resist its motions in one direction, means actuated by the motion of the body in the opposite direction to initially stress the resilient motion resisting member so as to increase its resistant force, and fluid pressure check means to check the resilient motion resisting member against resuming its normal relatively unstressed condition, said check means embodying a cylinder and piston therein connected with said resilient motion resisting member, there being leak ports adapted to pass fluid and to allow a checked movement of the piston under pressure of the initially stressed member.

11. In combination with a vibrating body, a means to check its vibrations embodying a compression spring connected at one end to the body so that movement of the body in one direction tends to compress the spring, means actuated by the motion of the body in the opposite direction and acting upon the spring at its other end to initially compress the spring so as to increase its resistance to compression when the body moves in the first mentioned direction, and fluid pressure check means acting upon the spring at its second mentioned end to check that end against resuming its normal position when the spring is initially compressed, said check means embodying a cylinder and piston therein connected to said second mentioned end of the spring, there being leak ports adapted to pass fluid and allow a checked movement of the piston under pressure of the initially compressed spring.

12. In combination with a pair of relatively vibrating bodies, an exterior cylinder connected to one of said bodies, a pair of pistons one in each end of the cylinder, a resiliently compressible member between the pistons adapted to be compressed by motion of either piston toward the other, connective means between the pistons and the other of said bodies so that relative movement of the two bodies in one direction causes one of said pistons to move toward the other and movement in the opposite direction causes the other of said pistons to move toward the first mentioned piston, and means independent of the connections to the vibrating bodies for checking the movements of the pistons back to their normal positions at the ends of the cylinder.

13. In combination with a pair of relatively vibrating bodies, a cylinder connected to one of said bodies, a pair of pistons one in each end of the cylinder, a compression spring confined between the pistons, and adapted to be compressed by motion of either piston toward the other, connective means between the pistons and the other of said bodies so that relative movement of the two bodies in one direction causes one of said pistons to move toward the other and movement in the opposite direction causes the other of said pistons to move toward the first mentioned piston, and means for establishing a fluid check between the pistons and the ends of the cylinder to check their spring impelled return to normal position, said check being independent of the connective means of the pistons to said vibrating body.

14. In combination with a pair of relatively vibrating bodies, a cylinder connected to one of said bodies, a pair of pistons one in each end of the cylinder, a compression spring confined between the pistons, and adapted to be compressed by motion of either piston toward the other, connective means between the pistons and the other of said bodies so that relative movement of the two bodies in one direction causes one of said pistons to move toward the other and movement in the opposite direction causes the other of said pistons to move toward the first mentioned piston, and means for establishing a fluid check between the pistons and the ends of the cylinder to check their spring impelled return to normal position, said check being independent of the connective means of the pistons to said vibrating body, said means embodying ports through the pistons adapted to restrictedly pass a fluid between the space inclosed by the pistons and the spaces between the pistons and the ends of the cylinder.

15. In combination with a pair of relatively vibrating bodies, means for checking their said vibration, embodying a headed cylinder connected with one of said bodies, a pair of pistons one in each end of the cylinder, a compression spring confined between the pistons, connection between the other of said bodies and said pistons such that movement of said body in either direction will cause the movement of one or the other of said pistons inwardly in said cylinder, and means for admitting and restrictedly discharging fluid to and from the spaces between the pistons and the cylinder heads.

16. In combination with a pair of relatively vibrating bodies, means for checking their said vibration, embodying a headed cylinder connected with one of said bodies, a pair of pistons one in each end of the cylinder, a compression spring confined between the pistons, connection between the other of said bodies and said pistons such that movement of said body in either direction will cause the movement of one or the other of said pistons inwardly in said cylinder, and means for admitting and restrictedly discharging fluid to and from the spaces between the pistons and the cylinder heads, said means embodying ports leading to said spaces of such size as to check the outflow of fluid when the spring urges the pistons toward the cylinder heads.

17. In combination with a pair of relatively vibrating bodies, means for checking their said vibration, embodying a headed cylinder connected with one of said bodies, a pair of pistons one in each end of the cylinder, a compression spring confined between the pistons, pulling connection between the other of said bodies and the piston at the opposite end of the cylinder, pushing connection between said body and the piston at the near end of the cylinder, so that movement of said body to and from said first mentioned body will cause one or the other of said pistons to move inwardly in said cylinder compressing said spring, and fluid pressure means independent of the connections to the vibrating body to check the outward movements of the pistons toward the cylinder heads.

In witness that I claim the foregoing I have hereunto subscribed my name this 23rd day of July 1915.

ALBERT S. JOHNSON.

Witnesses:
FRANK C. MAGRATH,
J. L. COBB.